INVENTOR.
HERMAN HORLACHER

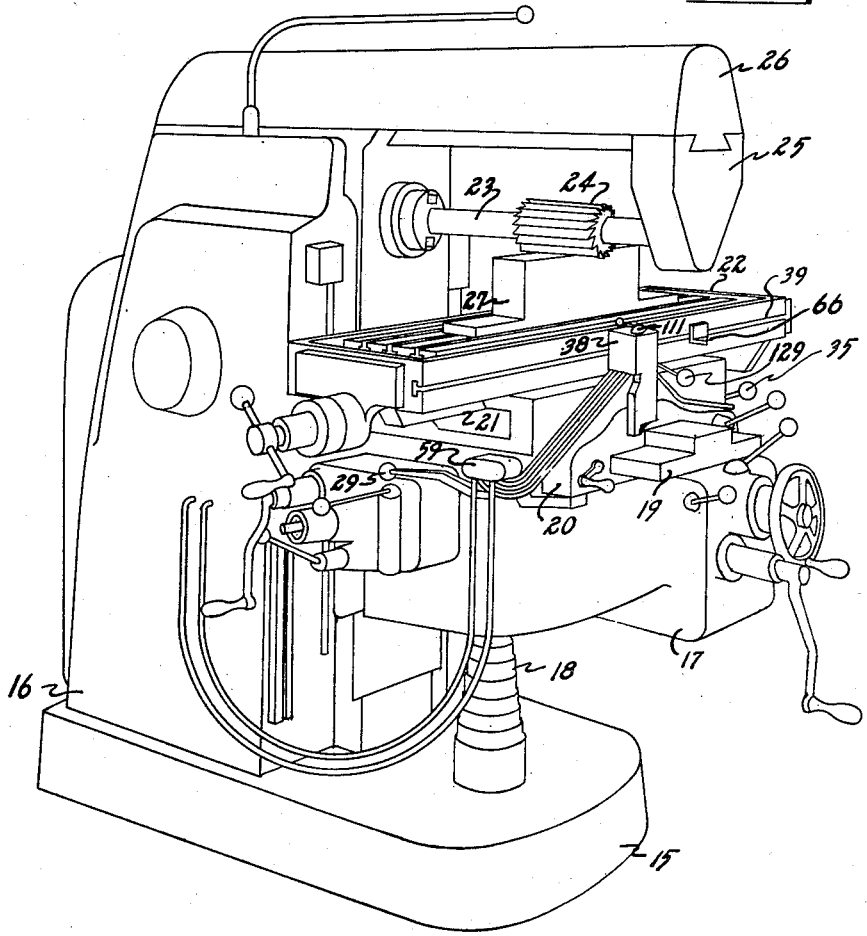

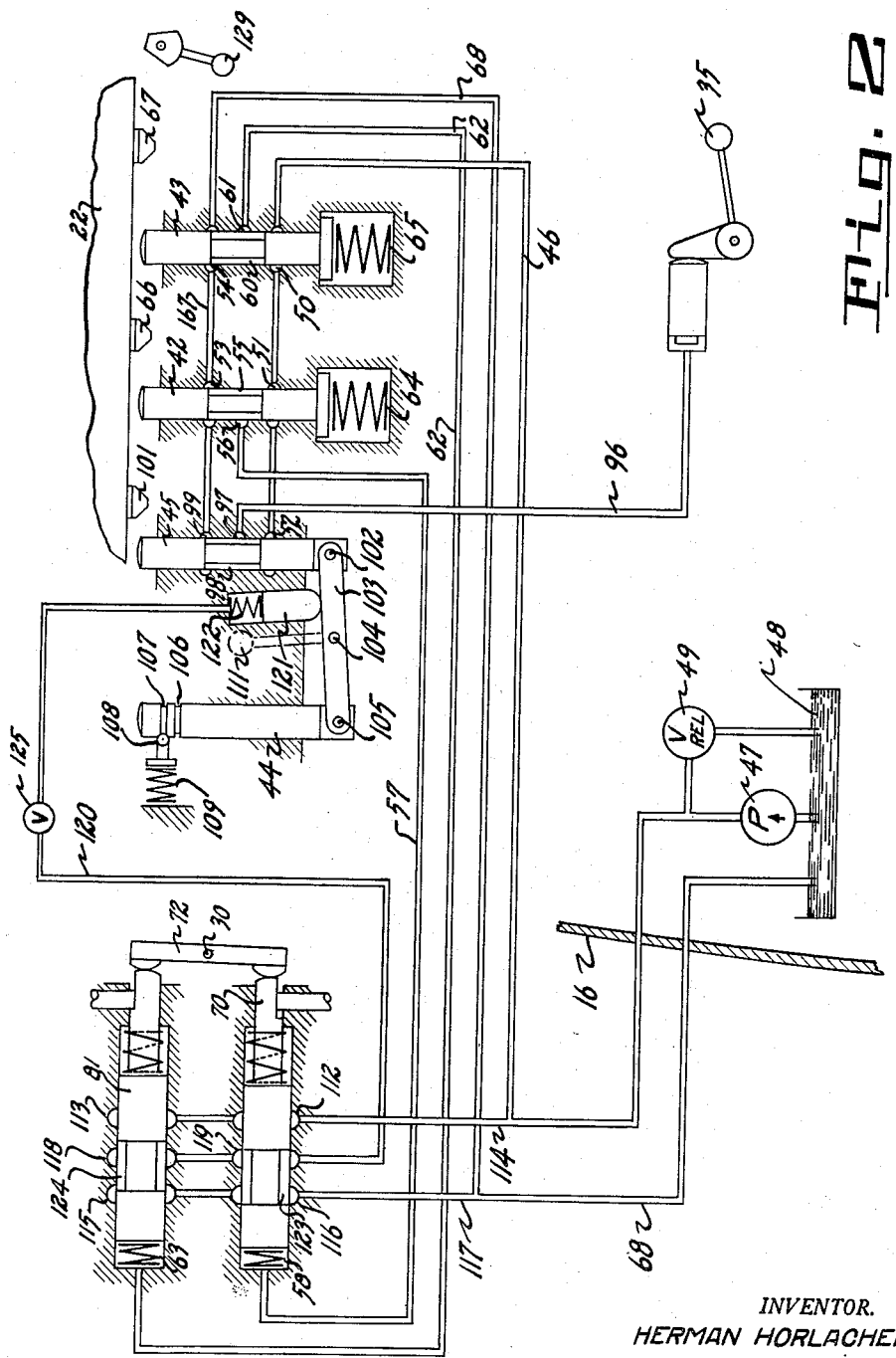

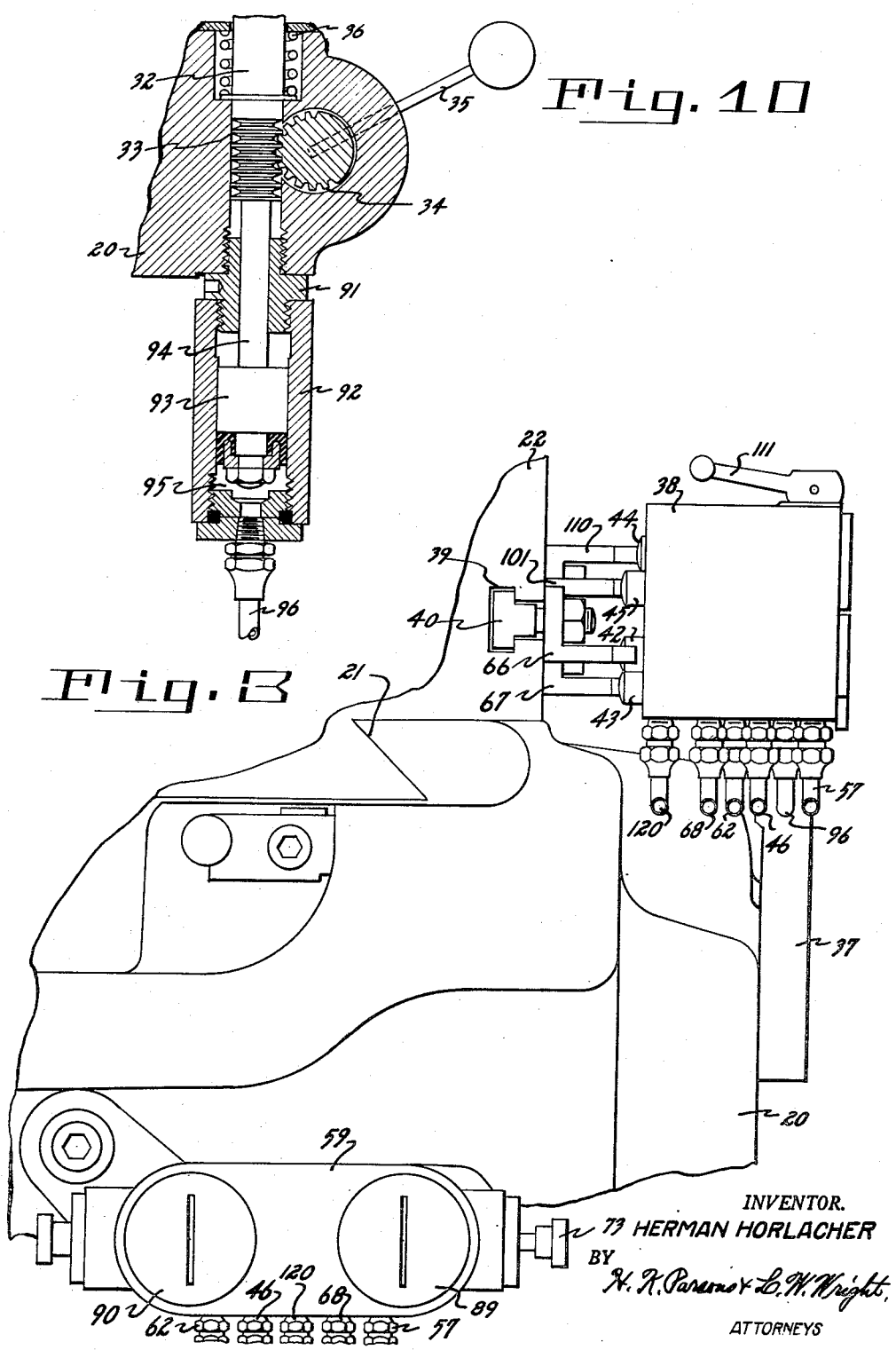

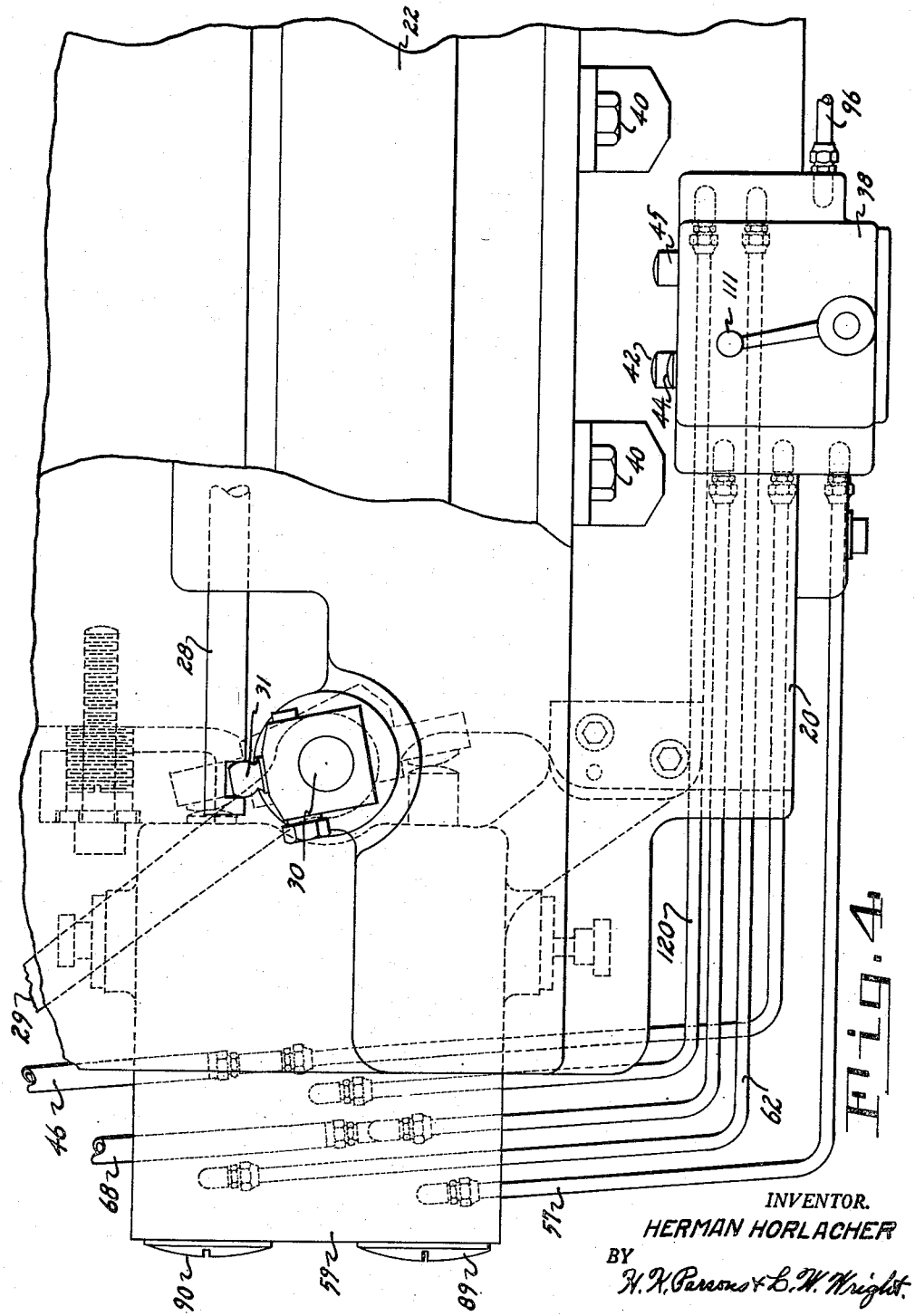

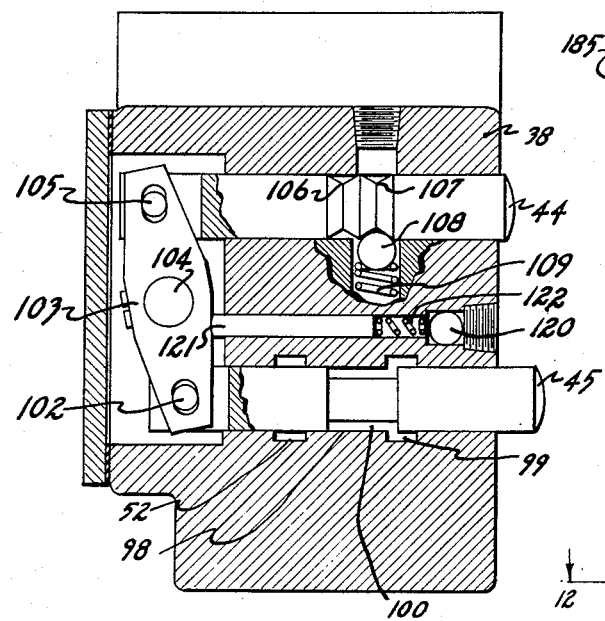
Fig. 6
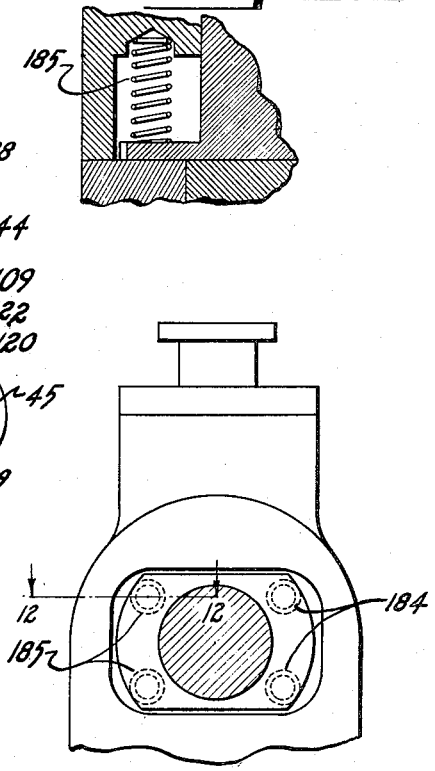
Fig. 12
Fig. 11
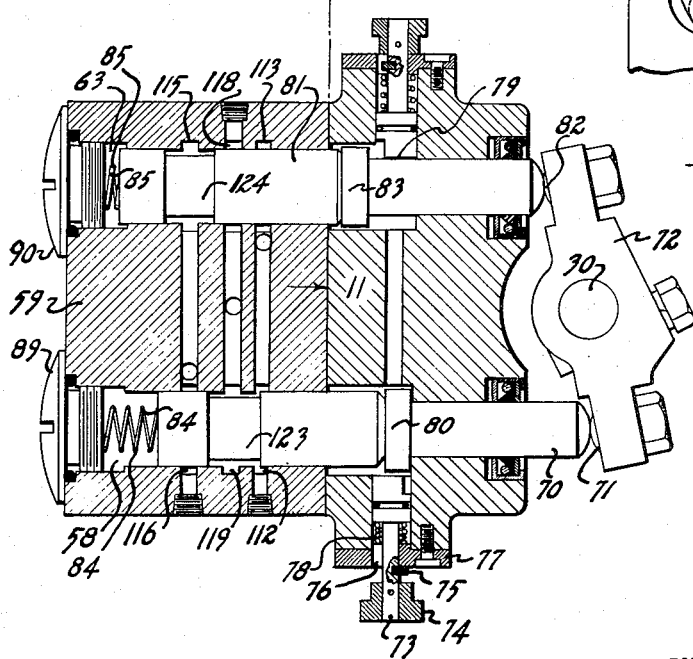
Fig. 8
INVENTOR.
HERMAN HORLACHER
BY
H. K. Parsons & C. W. Knight
ATTORNEYS

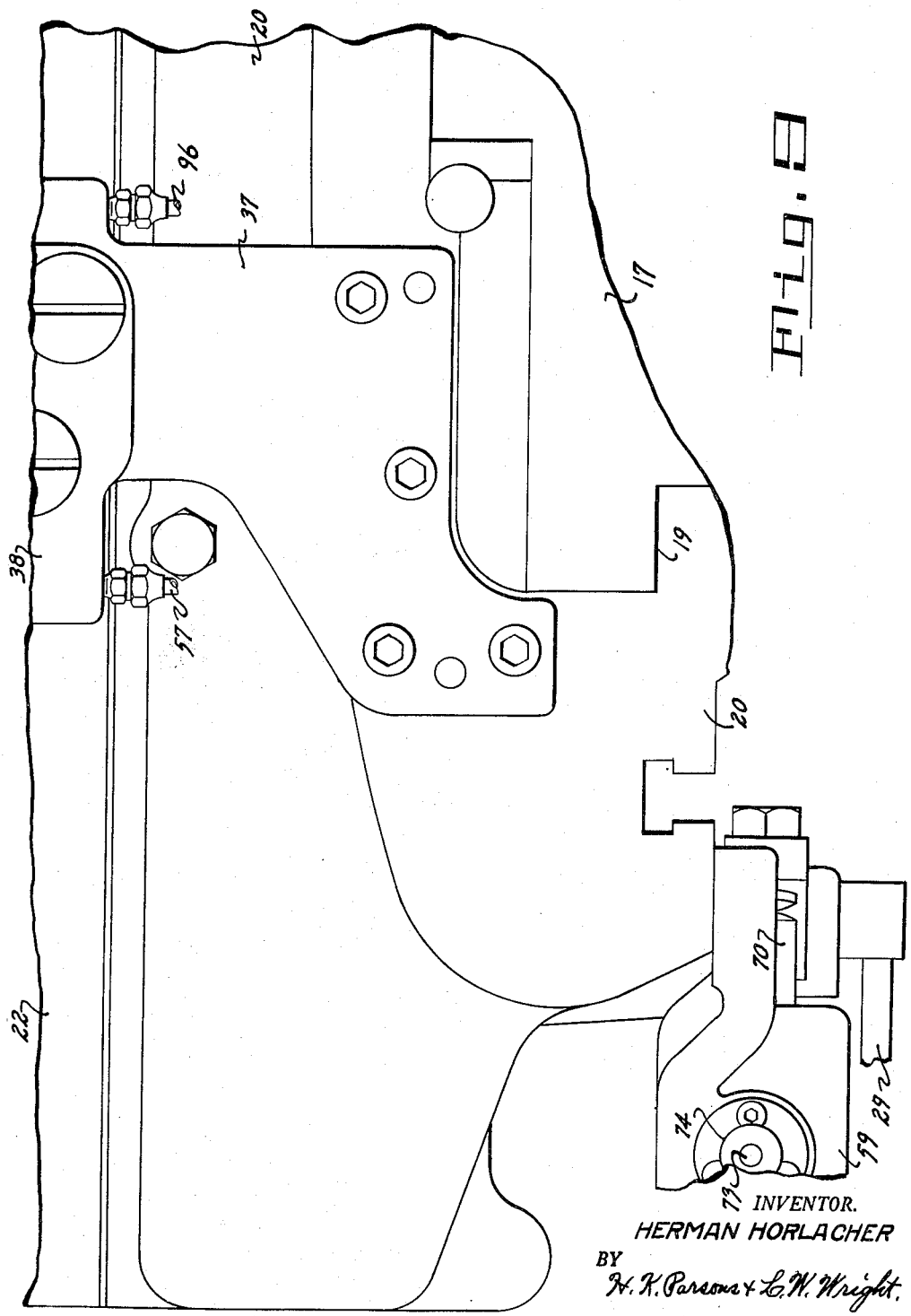

United States Patent Office 2,696,145
Patented Dec. 7, 1954

2,696,145

MACHINE TOOL CONTROL MECHANISM

Herman Horlacher, Cincinnati, Ohio, assignor to The Cincinnati Milling Machine Co., Cincinnati, Ohio, a corporation of Ohio Application December 17, 1949, Serial No. 133,555

3 Claims. (Cl. 90—21)

This invention relates to improvements in machine tools and has particular reference to a control mechanism therefor.

One of the principal objects of the present invention is the provision of a novel and improved control mechanism for effecting accurate automatic determination of relative movement of certain of the shiftable parts of a machine tool such as a milling machine, planer or the like.

A further object of the present invention is the provision of an improved hydraulic control mechanism for cyclic actuation of the mechanical shift mechanisms of a machine tool.

An additional object of the present invention is the provision of a structure which may either be built into the machine tool or applied as an attachment to existing machine tools for increase of their utility and facilitation of automatic cyclic operation thereof.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a perspective view of a milling machine embodying the present invention.

Figure 2 is a diagrammatic view of the hydraulic control mechanism and mechanical shifter elements actuable thereby.

Figure 3 is a fragmentary end view illustrating the application of the control mechanism of the milling machine.

Figure 4 is a similar plan view with a portion of the table broken away.

Figure 6 is a sectional view on the line 6—6 of Figure 3.

Figure 8 is a transverse section on the line 8—8 of Figure 3.

Figure 9 is a fragmentary view illustrating the mounting for the control bracket mechanism and the reverser unit.

Figure 10 is a fragmentary section illustrating the application of the rapid traverse control.

Figure 11 is a section on the line 11—11 of Figure 8; and

Figure 12 is a fragmentary section on the line 12—12 of Figure 11.

Figure 7:
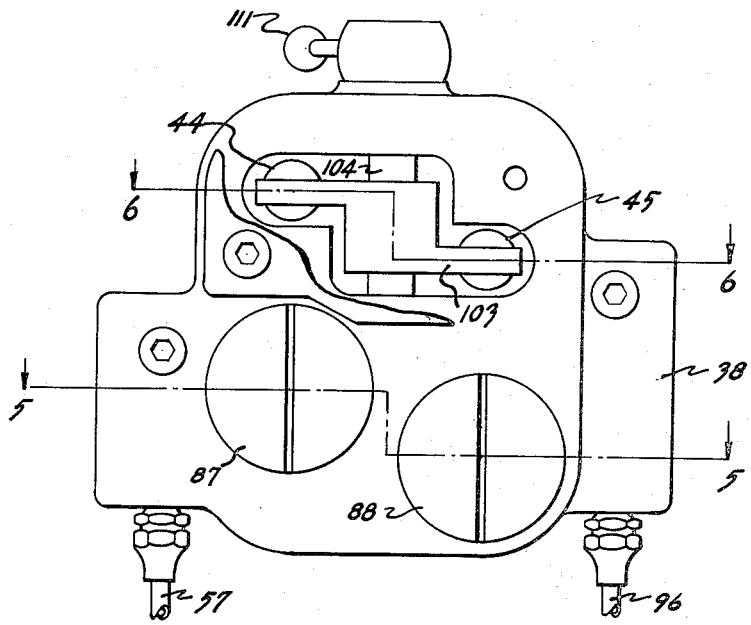
Figure 7 is a front elevation of the control bracket mechanism.

The invention has been shown as utilized in connection with a milling machine. This machine is of itself of conventional construction and is indicated of the knee and column type, such as the "Dial Type", machines manufactured by The Cincinnati Milling Machine Co. It includes the base 15 having rising therefrom the column 16 supporting the knee 17 vertically adjustable by mechanism as indicated at 18. This knee is provided with ways 19 guiding the saddle 20 for movement toward and away from the column. The saddle is, in turn, provided with ways as at 21 mounting table or movable element 22 for longitudinal reciprocation. Further carried by the column in overlying relation to the table 22 is the spindle 23 bearing cutter 24, the outer end of the spindle being supported by bracket 25 on overarm 26. In the performance of cutting operations the table bearing a work piece, as indicated at 27, is reciprocated on the bed to move the work relative to the cutter 24.

It is to be understood that while a conventional work piece has been indicated at 27, Figure 1, that various forms of work pieces or work pieces disposed in spaced relation may by mounted upon the table. For maximum cutting efficiency, and to minimize the effort and care necessary on the part of the operator it has been found desirable automatically to control as far as possible the movements of reciprocating tables or other elements in various machine tools including milling machines. The cycle of operation according to the particular work being operated on may consist merely of an advance of the work in one direction for cutting with an accurate stop and reversal of the table at the completion of the cut, may comprise a cycle which additionally will include rapid approach of the work to the cutter or, when several pieces are being successively cut, the addition of rapid traverse movement between individual pieces for effecting a saving in time, together with automatic rapid traverse return of the table and work after completion of the cutting operation to initial loading position, preferably accompanied by automatic stopping of the movement of the reciprocating element at this point.

Means for effecting movement and controlling direction of a translatable member are shown, for example, in U. S. Letters Patent 1,985,225 and 2,101,544, the specific details thereof forming no part of the present invention. Such machines conventionally include a reverser controllable, for example, by the shifter rod 28 and actuating lever 29 operating rock shaft 30 carrying the lug 31 cooperating with the shifter rod 28. Such transmission may likewise include a feed-rapid traverse selector clutch operable by the selector rod or clutch shifter 32 which, as illustrated, is mounted for vertical reciprocating movement effectable through rack 33 on the rod engaged by the pinion 34 oscillatable by rapid traverse control lever 35. Suitable means, such as a spring 36, normally urge the rod 32 downwardly to maintain the feed drive in engagement. Upward movement, however, of rod 32 effectable either by handle 35 or otherwise as hereinafter described serves, while the rod is maintained in this upward position, to connect the rapid traverse drive to the table transmission for actuation thereof at a rapid traverse rate in one direction or the other depending on the setting of the transmission reverser as controlled for example, by the shifter rod 28.

The control mechanism of the present invention, while having the capacity of being built into new machines, has been illustrated as itself comprising a complete entity readily applicable to existing machines of the type above described. For this purpose, there is mounted on the front of the saddle 20 a supporting bracket 37 carrying the control block or unit 38 in a position overlying the T slot or dog slot 39 in the front edge of the table. This slot is adapted to receive the T bolt or bolts 40 for attachment to the front of the table of various L-shaped dogs such as 66, 67, and 101 for engagement with control plungers such as 42, 43, 44, and 45 individually slidably mounted in suitable bores in the body of the control block 38.

It will be noted that the member 38 supporting the plungers constitutes a valve block receiving a suitable actuating medium such as oil under pressure through the pipe or conduit 46. This may be supplied from the lubricating or like pump 47 conventionally contained in the column of the machine which draws oil from the tank or sump 48 to be circulated for lubrication and other purposes at a pressure determined by the variable relief valve 49. The pressure conduit 46 is coupled to groove 50 circumscribing plunger 43, groove 51 circumscribing plunger 42 and groove 52 circumscribing plunger 45. The detail arrangement of parts in this connection as respects plungers 42 and 43 will be best understood by reference to Figure 5 from which it will be seen that there are the additional grooves 53 and 54 circumscribing respectively the plungers 42 and 43, plunger 42 having a reduced portion as at 55 adapted alternatively to couple groove 51 or groove 53 by way of groove 56 and conduit 57 to piston cylinder or chamber 58 in the reversing box 59. Similarly, plunger 43 has a reduced portion or cannelure 60 adapted alternatively to couple groove 50 or groove 54 by way of groove 61 and conduit 62 to the piston cylinder or chamber 63 in the reversing box 59.

Figure 5:
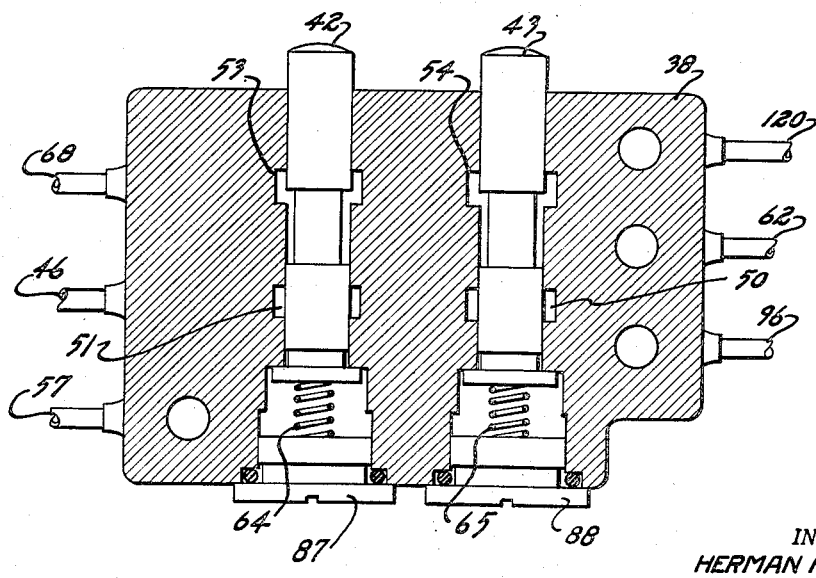
Figure 5 is a horizontal sectional view as on the line 5—5 of Figure 3.

As shown in Figure 5, both plungers 42 and 43 are normally urged into extended position by the springs 64 and 65 respectively so that their terminal portions project at the inner face of the block 38. These plungers, see Figures 3 and 7, are at different horizontal levels, the plunger 42 being at the upper level for engagement with the dog 66 and the plunger 43 at a lower level for engagement by the dog 67. Due to this location, each dog is individual to a particular plunger for determination of its operation. With the parts in the position indicated in Figures 3 and 4, for example, movement of the table toward the left as viewed in Figure 1, will cause dog 66 to contact and depress plunger 42. Under normal conditions the plunger 42 is pressed outwardly by spring 64 so that groove 56 is coupled by way of groove 53, conduit 167 and groove 54 to the exhaust or reservoir conduit system 68. On depression of the plunger, however, its inward movement will close off communication with groove 53 and open communication by way of cannelure 55 and groove 51 from pressure line 46 through 57 to chamber 58. This action will project the reversing piston or plunger 70 into engagement with the adjustable abutment 71 on rocker 72 carried by shaft 30, causing the member 72 to assume the position as shown in Figure 8. This reacts through the member 28 on the conventional transmission of the machine effecting a reversal of the table operative effect of the transmission so that it will move in the opposite or left hand direction.

If it is desired that the machine simply stop at the selected point in place of reversing, the pin 73 is turned by the knurled head 74 to move the lock stud 75 into alignment with slot 76 in the cap plate 77. When so shifted, spring 78 will tend to move the pin inward from the position of the parts above designated at the bottom of Figure 8 to the position shown of the corresponding parts at the upper portion of Figure 8. This will project the abutment or stop 79 in the path of collar 80 on plunger 70, limiting the extent of its inward movement to the position diagrammatically indicated in Figure 2. Such limited movement will cause a disconnection or stoppage of the table drive at the trip determined point.

Reaction of plunger 43 on the reversing piston or plunger 81 corresponds to that just described in connection with plunger 70. Depression of the plunger 43 couples pressure conduit 46 by way of groove 50, plunger groove 60 and conduit 62 to chamber 63 to effect inward movement of the plunger 81, contacting abutment 82 on rocker 72 and moving control shaft 30 in the reverse direction to that effected by piston plunger 70. As shown in Figure 8, the abutment 79 is so positioned as to engage the collar 83 on plunger 81, so that with this adjustment the member 72 may be rocked only to a stop position. Light springs 84 and 85 bear against the plungers 70 and 81 to hold same outwardly toward the respective abutments 71 and 82. This outward movement is normally limited by the interposed heavier compressing springs 184 and 185 which are so arranged in opposition to the springs 84 and 85 that the plungers 70 and 81 will normally occupy the intermediate position indicated in Figure 2, at which they are stabilized between the respective springs and with the pressure couplings as indicated in Figure 2. It is only when the stops or abutments 79 are withdrawn and the plungers or pistons are hydraulically actuated that the springs 184 or 185 are compressed so that the plungers may be projected to reversing position as is indicated with respect to plunger 70 in Figure 8. The movement of clutch shifter rod 28 accentuated and controlled by the customary load and fire detent mechanism, such as shown in U. S. Letters Patent 2,101,544, for completing movement initiated by handle 29 of the plungers 70 and 81 in rocking the member 72 to either left hand or right hand feed positions or retaining it in intermediate neutral.

Screw plugs, such as 87, 88, 89, and 90, at the outer face of the valve block 38 and the reverser block 59 serve as closures for the respective plunger bores to retain the associate parts including plunger actuating springs in proper position.

It will be understood that the mechanism just described in itself constitutes a complete operable entity readily applicable to existing milling machines or other machine tools, and when employed provides a sensitive readily operated hydraulic plunger mechanism freely movable by a properly set control dog on the moving machine tool element, requiring slight pressure for its actuation but by its movement coupling a source of hydraulic power to the auxiliary hydraulic shifting mechanism to effect a rapid power reaction on the mechanical shifting devices to effect accurate stopping or reversal of the table or other machine tool element. The nature of the attachment is such that this accurate response will be repetitive at all times at the same point in the table stroke, and thus extreme accuracy of work piece production may be easily attained.

In addition to the feature of accuracy of stopping or reversing the table, it is frequently desirable that employment be made of rapid traverse movements, either in approach of the work to the tool, in movement between one work piece and another as when intermittent milling operations are being performed, or in return of the finished work to removal and loading position. Many machine tools are now equipped with mechanism for effecting such rapid traverse movements by hand control at the will of the operator. It is, therefore, further a purpose of the present invention to provide in connection with the structure just described a cooperating rapid traverse control mechanism so that by joint employment of the two mechanisms different and varied automatic cycles of operation may be effected dependent on dog positionings, as for alternate feed and rapid traverse movements in a single direction, feed in one direction, rapid traverse in the other, or both in a continuous automatic cycle.

For attainment of this result there is shown as secured to the saddle 20 a fitting 91 supporting a sleeve 92 in alignment with the rapid traverse plunger 32. Within the sleeve is a piston 93 coupled by piston rod 94 with the rod 32 so that upward movement of the piston 93 in sleeve 92 will shift the feed-rapid traverse selector clutch of the machine to couple a rapid traverse drive (not shown) with the table or translatable member. Formed in the lower end of the sleeve 92 is a pressure chamber 95 connected by conduit 96 with groove 97 of the bore 98 in which slides the plunger 45. Formed in the bore and circumscribing the plunger are the additional grooves 52 and 99. As has been previously mentioned, the groove 52 is coupled by conduit 46 with the pump or pressure source 47 so that when plunger 45 is in a depressed position its cannelure or groove 100 will couple pressure through groove 97 and conduit 96 with the chamber 95 to move and hold the piston 93 upward for rapid traverse operation of the table or slide in a direction determined by the position of rock shaft 30 and reverser controlling rod 28. This inward or depressing movement of plunger 45 is effectible by engagement of the dog 101 with its outer projecting end.

The forward or left hand end of the plunger 45 as viewed in Figure 6 is connected by a pivot 102 with link 103 pivotally mounted in the block 38 by rock shaft 104 and having its opposite end connected to pivot 105 carried by the forward or left hand end of the plunger 44. The plunger 44 itself constitutes purely a power transmitter without valving action but is provided with the detent grooves 106 and 107 for selective engagement with the spring detent or ball 108 inwardly actuated as by spring 109. This detent serves to lock the plunger 44 and thus through link 103 the plunger 45 either in its extended position as shown in Figure 6, or alternatively in retracted position with the plunger 44 in projected position. When the plunger 44 is in projected position it is adapted for engagement by dog 110 carried by the table. Such engagement will force plunger 44 into the retracted position shown in Figure 6 and thus move plunger 45 to the position shown in Figures 2 and 6. In this position, conduit 96 to the rapid traverse control piston 93 is coupled by 97, 167—68 to reservoir so that the plunger assumes feed establishing position. When plunger 45 is dog depressed it will be locked in position for maintaining rapid traverse action in a direction determined by the reverser of the transmission until such time as the plunger 44 is engaged and depressed to restore feeding action. Alternatively, the rapid traverse action may be controlled by handle 111 secured to the upper end of rock shaft 104 for actuation of member 45 and its associated parts.

In addition to this combined manual and dog control of rapid traverse, additional means have been provided for effecting automatic institution of rapid traverse when desired in connection with the automatic reversal. For accomplishment of this result there has been provided in the block 59 the pressure grooves 112 and 113, circumscribing the bores for the plungers 70 and 81 and coupled by branch pressure line 114 with the pump 47. There have additionally been provided the grooves 115 and 116 coupled by branch 117 with the return or exhaust conduit 68. Intermediately coupled with the bores of the plunger 70, 81 as at 118 and 119, is conduit 120 extending to piston plunger 121. This plunger is slidably mounted in the block 38 for engagement with the link 103 intermediate pivot 102 and shaft 104 so that pressure against the piston will project the same from the position shown in Figure 6 to rock member 103, thus moving plunger 45 into rapid traverse position. A light spring 122 normally retains the plunger against link 103 as indicated in Figure 6. The plunger 70 is provided with an intermediate cannelure or connecting groove 123 and the plunger 81 with a groove 124 of such length and extent that when either 70 or 81 is in the neutral or stop position conduit 120 is connected by way of the groove to exhaust conduit 68 so that no pressure exists against the piston element 121, as is indicated in Figure 2. When either plunger 70 or 81 is projected to effect reversal of the drive transmission by oscillation of the members 72—30 the groove of the projected plunger will then connect pressure conduit 114 with conduit 120, introducing pressure against the piston 121 and at the same time blocking off the associated exhaust groove such as 116. At the same time, the opposite plunger 70 or 81 will be moved by the oscillation of 72 to a position such as shown in Figure 8 so that its intermediate cannelure is out of alignment with the intermediate piston pressure control groove 119 or 118 so that the body of the plunger blocks flow by way of the depressed plunger to exhaust, causing the necessary actuating pressure to be built up in conduit 120. The relative positioning of plungers 70 and 81 for effecting this result is shown for counterclockwise oscillation of the member 72 or change from movement of the table toward the right to movement of the table toward the left in Figure 8, so that with this relationship of the parts there will not only be a reversal of direction but a concomitant change from feed right to rapid traverse return. When the change is made from feed left to movement in a right hand direction, the position of the plungers 70 and 81 will be reversed so that the member 79 will couple the pressure actuating medium to the piston plunger 121 while the plunger 70 will block off the reservoir return as respects groove 119. It will, of course, be evident that this connection in of the rapid traverse takes place only when plunger 70 or 81 is free for movement automatically to effect actuation of the reversing mechanism, but that there is no automatic rapid traverse effect by movement of the plungers so long as the abutments 79 are in position to limit the advance to a stop or neutral position only of the member 72, as rearward or left hand deflection as pointed out, merely blocks off the flow as respects conduit 120.

Additionally, in the event it should be desired to effect automatic reversal without use of rapid traverse, a valve 125 may be provided to shut off flow through the conduit 120, rendering pressure ineffective as respects plunger 121.

The commercial milling machine embodiment selected for the purpose of illustration of the application and utilization of the present invention has been particularly illustrated in Figure 1, although it will be understood that the features hereinabove described are capable of utilization in connection with various known types of milling machines. As there illustrated, however, the machine is provided with a conventional table power control lever 29 which in intermediate position disconnects the power drive from the table and shifted in one direction or the other operates by suitable means such as a clutch, not shown, for coupling the drive transmission to actuate the table toward the left or toward the right through movement of the shift bar 28. This movement is likewise controllable by the second control or starting and stopping lever 129 at the front of the machine. Additionally, the manually actuable lever 35 is provided which, when hand depressed, as against a suitable spring (not shown) will throw out the feed clutch of the transmission and temporarily connect a rapid traverse drive for effecting movement of the table at a higher rate of speed in a direction determined by the existing position of the reversing mechanism. This permits of effecting what is known as intermittent feed or successive rapid traverse and cutting rate or feeding movement of the table unidirectionally or in both directions, depending on the particular milling operation to be performed and whether but a single work piece, such as 27 shown in Figure 1, is being operated upon, or a plurality of work pieces in which it is desired to move at a rapid rate between cutting stations. In such conventional milling machines it has been customary to use dogs on the table directly to actuate a mechanical trip mechanism or load fire device such as indicated in particular in Figure 4 for determining stopping or reversal of table movement. It has been found, however, that this is frequently objectionable in that the resistance and drag between trip dog and trip mechanism and any relative play in the motion transmitting mechanism may result in inaccuracies of operation.

The present invention has, therefore, eliminated these difficulties by providing the series of dog actuable freely sliding plungers affording resistance only of the light projecting springs as shown for the plungers and by incorporation of valve means in these freely sliding plungers is able to make use of either separate or available hydraulic power for effecting instantaneous positive movement of the reversing mechanism and is likewise able to effect either independent dog controlled engagement and release of the rapid traverse mechanism or power effected combined reverse and rapid traverse movements in a most positive and highly accurate manner not subject to the limitations of previous mechanical structures.

It will, therefore, be noted that the invention in its entirety includes a hand selector for feed or rapid traverse by power operation of existing elements in the milling machine, together with dog operable means for additionally controlling such selector mechanism by suitable conditionings of the hydraulic control system. It also includes, in addition to the normal hand determination of feed right, feed left, or stop movements of the table or translatable element, such mechanism being broadly referred to as the reverser mechanims, a hydraulic operating mechanism additive to the normal hand controls for effecting several positionings of the reverser, together with free moving dog operated plungers for determining the selective positionings of the reverser. Additionally, and in connection with this hydraulic mechanism, there has been provided means for variably determining the amount of movement of the reverser actuating mechanism for selectively effecting stopping or reversing movements and coupled therewith hydraulic mechanism for concomitantly and in connection with a single movement of a control plunger or element activating both the reverser and the rapid traverse, which mechanism is independent of the previously referred to rapid traverse control device and insures proper simultaneous actuation of the elements without loss of time or possible failure of operation of one or the other when dependence is placed on individual dogs for separating effecting each of the transmission rate and direction changes or modifications.

Operation

With the various controls just described practically any desired type of operating cycle may be effected. For example, starting with the table at either the right or the left, a simple cycle may be performed of rapid advance of the work to the cutter, feed of the work past the cutter, rapid return and stop. Alternative cycles may include a change on the return stroke from rapid return to feed and subsequent stopping or rapid reverse to an intermediate stop point, an intermittent feeding, such as rapid traverse, feed, second rapid traverse and feed, and reverse at rapid traverse and stop; or a rapid traverse, feed, reverse feed, rapid traverse and stop, depending on the several adjustments of the control dogs for engagement with the respective plungers and of the positioning of the limiting abutments 79 for determination of the ultimate movement of the plungers 70 and 81.

Considering a simple cycle, such as advantageously utilizable in connection with the work piece 27 shown in Figure 1 it will be understood that the cycle starts with the table 39 in a right hand position away from the cutter a sufficient distance that the work piece may be readily mounted and clamped in position upon the table. The system may be then continued through movement of selector lever 127 on rock shaft 104 to depress plunger 45 and raise plunger 44, thus coupling hydraulic actuating medium with piston 93 holding the rapid traverse clutch in engagement with the drive transmission. The work having been clamped, by actuation of start lever 29 or 129 the main power connecting reverser clutch mechanism previously in neutral position is directionally shifted to initiate power movement of the table toward the left. So long as plunger 45 is depressed this will be at a rapid traverse rate. However, as the work approaches cutting position, dog 110 will depress plunger 44, coupling the hydraulic conduit 96 to return conduit 68 when the table will continue to move to the left. At this time, the several plungers will occupy the position shown in Figure 2. As the work is completed, dog 67 will engage and depress plunger 43. If the abutment 79 is in its inward position the action of the hydraulic actuating medium through conduit 62 will move plunger 81 against the abutment, during this movement rocking member 72 sufficiently so that it will snap past the detent at 86 into neutral or stop position. If, however, the abutment is withdrawn the hydraulic pressure will completely project plunger 81, effecting additional clockwise movement of 72 to effect complete movement of the reverser for power drive of the table by the transmission in the opposite direction. This additional forward movement of the plunger 81 will couple power conduit 114 by way of groove 124 with conduit 120, thus projecting piston plunger 121 and moving plunger 45 again into position to couple 46 with 96. In this manner simultaneous actuation of reversal of direction and change from feed to rapid traverse rate is automatically effected by movement of a single control plunger and integral valving means. The table 22 will then move at rapid traverse rate to the right to its original loading position, at which point depression of plunger 42 by dog 66 will connect power line 46 by way of groove 53 with the piston portion of plunger 81 which will then kick the member 72 into its intermediate or neutral position, assuming that the stop block 79 limits the movement of the plunger so that reversal is not effected.

Attainment of any of the other cycles described requires no additional mechanism or change in the structural elements illustrated but may be readily effected merely by variations in position of the abutment or stop elements such as 79 and the positioning of the several dogs along the table slot for engagement as desired at selected positions with the respective control plungers actuable thereby.

What is claimed is:

1. An attachment for a milling machine to control the cycle of movement thereof, said attachment including a valve block, a pair of control plungers carried by the valve block, each of said plungers having a valve portion, a reverser actuating mechanism including a pair of piston elements, hydraulic connections between the valve portions of each of the plungers and one of said piston elements whereby the operation of said piston element is individually controlled by the connected plunger, said attachment including a rate selecting plunger, each of the pistons having a valve portion shiftable upon movement of the piston alternatively into a circuit completing or a circuit interrupting position, a pressure circuit coupled with both of said piston valve portions, and a hydraulic actuating circuit for said rate selecting plunger including conduit means having branches individually connecting the valve portion of each piston with the rate selecting plunger whereby movement of either of said pistons and its associate valve portion individually controls the coupling of the pressure circuit and the hydraulic actuating circuit by way of the valve portion with said plunger.

2. An attachment for a milling machine to control the cycle of movement thereof, said attachment including a valve block, a pair of control plungers carried by the valve block, each of said plungers having a valve portion, a reverser actuating mechanism including a pair of piston elements, hydraulic connections between the valve portions of each of the plungers and one of said piston elements whereby the operation of said piston element is individually controlled by the connected plunger, said attachment including a rate selecting plunger, each of the pistons having a valve portion shiftable upon movement of the piston alternatively into a circuit completing or a circuit interrupting position, a pressure circuit coupled with both of said piston valve portions, a hydraulic actuating circuit for said plunger including conduit means having branches individually connecting the valve portion of each piston with the rate selecting plunger whereby movement of either of said pistons and its associate valve portion individually controls the coupling of the pressure circuit and the hydraulic actuating circuit by way of the valve portion with said plunger, and selector means for determining the extent of movement of an individual piston element and its associated valve portion.

3. An attachment for a milling machine to control the cycle of movement thereof, said attachment including a valve block, a pair of control plungers carried by the valve block, each of said plungers having a valve portion, a reverser actuating mechanism including a pair of piston elements, hydraulic connections between the valve portions of each of the plungers and one of said piston elements whereby the operation of said piston element is individually controlled by the connected plunger, said attachment including a rate selecting plunger, each of the pistons having a valve portion shiftable upon movement of the piston alternatively into a circuit completing or a circuit interrupting position, a pressure circuit coupled with both of said piston valve portions, a hydraulic actuating circuit for said plunger including conduit means having branches individually connecting the valve portion of each piston with the rate selecting plunger whereby movement of either of said pistons and its associate valve portion individually controls the coupling of the pressure circuit and the hydraulic actuating circuit by way of the valve portion with said plunger, selector means for determining the extent of movement of an individual piston element and its associated valve portion, and additional valve means in the actuating circuit between the piston valve portions and the rate selector plunger for determining the effectiveness of the hydraulic actuating circuit.

References Cited in the file of this patent

UNITED STATES PATENTS

| Number | Name | Date |
|---|---|---|
| 795,024 | Case | July 18, 1905 |
| 1,251,563 | O'Donnell | Jan. 1, 1918 |
| 1,330,557 | Simmon et al. | Feb. 10, 1920 |
| 1,733,784 | Dinzl | Oct. 29, 1929 |
| 2,082,140 | Bennett | June 1, 1937 |
| 2,120,196 | Wright | June 7, 1938 |
| 2,275,241 | Armitage | Mar. 3, 1942 |
| 2,363,706 | Svenson | Nov. 28, 1944 |
| 2,379,306 | Larson | June 26, 1945 |
| 2,489,227 | Roehm | Nov. 22, 1949 |
| 2,533,753 | Armitage | Dec. 12, 1950 |
| 2,605,748 | Rasoletti | Aug. 5, 1952 |